United States Patent
Evans et al.

(10) Patent No.: US 8,132,088 B2
(45) Date of Patent: Mar. 6, 2012

(54) DATA FORMATTING IN DATA STORAGE

(75) Inventors: Nigel Ronald Evans, Bristol (GB); Andrew Hana, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1239 days.

(21) Appl. No.: 11/838,498

(22) Filed: Aug. 14, 2007

(65) Prior Publication Data
US 2009/0046386 A1   Feb. 19, 2009

(51) Int. Cl.
*G06F 11/10*   (2006.01)
*H03M 13/00*   (2006.01)

(52) U.S. Cl. ........................................ 714/807; 714/758

(58) Field of Classification Search .................. 714/758, 714/807
See application file for complete search history.

(56) References Cited

U.S. PATENT DOCUMENTS

| | | | | |
|---|---|---|---|---|
| 5,375,128 | A * | 12/1994 | Menon et al. | 714/770 |
| 6,631,485 | B1 * | 10/2003 | Morley et al. | 714/701 |
| 7,149,847 | B2 * | 12/2006 | Frey et al. | 711/114 |
| 7,770,096 | B1 * | 8/2010 | Beard et al. | 714/807 |
| 2003/0065973 | A1 * | 4/2003 | Vollrath et al. | 714/7 |
| 2005/0166083 | A1 * | 7/2005 | Frey et al. | 714/6 |
| 2007/0162658 | A1 * | 7/2007 | Furukawa et al. | 710/52 |

* cited by examiner

*Primary Examiner* — M. Mujtaba K Chaudry (57) ABSTRACT

A method of processing data comprising arranging data into a data group comprising a plurality of sub groups each said subgroup comprising a plurality of columns; for each column, determining at least one checksum data of said column; and for each column, storing the checksum data of that column within at least one said subgroup of the group, other than the subgroup to which said column belongs.

20 Claims, 10 Drawing Sheets

| LFID | 1 | | 2 | | --- | | 22 | | 23 | |
|---|---|---|---|---|---|---|---|---|---|
| Azimuth | A | B | A | B | --- | | A | B | A | B |
| Repetition 23 PI6 | 1 | 2 | 3 | 4 | | | 43 | 44 | 45 | 0 |
| PI5 | 0 | 1 | 2 | 3 | | | 42 | 43 | 44 | 45 |
| | | | | | | | | | | |
| Repetition 22 PI6 | 45 | 0 | 1 | 2 | | | 41 | 42 | 43 | 44 |
| PI5 | 44 | 45 | 0 | 1 | | | 40 | 41 | 42 | 43 |
| ⋮ | ⋮ | ⋮ | ⋮ | ⋮ | ⋮ | | ⋮ | ⋮ | ⋮ | ⋮ |
| Repetition 1 PI6 | 3 | 4 | 5 | 6 | | | 45 | 0 | 1 | 2 |
| PI5 | 2 | 3 | 4 | 5 | | | 44 | 45 | 0 | 1 |
| Repetition 0 PI6 | 1 | 2 | 3 | 4 | | | 43 | 44 | 45 | 0 |
| PI5 | 0 | 1 | 2 | 3 | | | 42 | 43 | 44 | 45 |
| Track ID | 0 | 1 | 2 | 3 | | | 42 | 43 | 44 | 45 |

Fig. 8.

| Track ID | 0 | 1 | 2 | 3 | ... | 10 | 11 | ... | 18 | 19 | ... | 42 | 43 | 44 | 45 |
|---|---|---|---|---|---|---|---|---|---|---|---|---|---|---|---|
| | A | B | A | B | | A | B | | A | B | | A | B | A | B |
| | (1) | | (2) | | | (6) | | | (10) | | | (22) | | (23) | |
| PI 19 | 33 | 33 | 35 | 35 | | 43 | 43 | | 35 | 35 | | 43 | 43 | 45 | 45 |
| PI 18 | 32 | 32 | 34 | 34 | | 42 | 42 | | 34 | 34 | | 42 | 42 | 44 | 44 |
| PI 17 | 17 | 17 | 19 | 19 | | 27 | 27 | | 19 | 19 | | 27 | 27 | 24 | 24 |
| PI 16 | 16 | 16 | 18 | 18 | | 26 | 26 | | 18 | 18 | | 26 | 26 | 23 | 23 |
| PI 6  | 1  | 1  | 3  | 3  | | 11 | 11 | | 3  | 3  | | 11 | 11 | 13 | 13 |
| PI 5  | 0  | 0  | 2  | 2  | | 10 | 10 | | 2  | 2  | | 10 | 10 | 12 | 12 |
| PI 19 | 33 | 33 | 35 | 35 | | 43 | 43 | | 35 | 35 | | 43 | 43 | 45 | 45 |
| PI 18 | 32 | 32 | 34 | 34 | | 42 | 42 | | 34 | 34 | | 42 | 42 | 44 | 44 |
| PI 17 | 17 | 17 | 19 | 19 | | 27 | 27 | | 19 | 19 | | 27 | 27 | 29 | 29 |
| PI 16 | 16 | 16 | 18 | 18 | | 26 | 26 | | 18 | 18 | | 26 | 26 | 28 | 28 |
| PI 6  | 1  | 1  | 3  | 3  | | 11 | 11 | | 3  | 3  | | 11 | 11 | 13 | 13 |
| PI 5  | 0  | 0  | 2  | 2  | | 10 | 10 | | 2  | 2  | | 10 | 10 | 12 | 12 |

DATA FORMATTING IN DATA STORAGE

TECHNICAL FIELD

The present invention relates to tape data storage methods and apparatus.

BACKGROUND

In 1989, Hewlett Packard defined the digital data storage (DDS) format for data storage. Digital data storage (DDS) is a format for storing and backing up computer data on magnetic tape that evolved from digital audio tape (DAT) technology, which was originally created for CD quality audio recording. The (DDS) format is defined in ISO/ICE standard 10777:1991 E. DDS format devices have developed through versions DDS-1 to DDS-4, through DAT72, and DAT160 tape formats.

DDS tape drives use helical scanning for recording. There are two read heads and two write heads. The read heads verify the data which has been written to the tape. If errors are present, the write heads can re-write the data in a same pass during recording.

DDS formats use C1 and C2 error correction codes to apply redundancy to user data. Additionally, digital data storage (DDS) tape drives can correct erroneous data by the use of double C3 error correction. Double C3 correction works by splitting a DDS format group of data into a two dimensional array of bytes. This array has 44 columns, and the number of rows is determined by the number of user data bytes in a column. A group is split into 22 frames with 2 columns per frame and the number of C3 codewords is equal to the number of user data bytes in a column. For example, if a group is 1,537,448 bytes, then there will be 68,884 rows.

Double C3 correction takes each row of 46 bytes and can correct up to two of these bytes if their locations are known, or one of those bytes if their locations are unknown. A C3 frame consisting of 2 additional columns is computed from the rows (in the example from the 68,884 rows). The C3 frame is added to the existing 44 columns (existing 22 frames of user data). It is a requirement that the position of the "bad" bytes are known prior to correction. If another of these 46 bytes is unknowingly in error, then a mis-correction can occur such that the C3 algorithm treats the C3 correction as having been successful, but in fact a corruption has occurred.

Because of this, further verification is performed after double C3 correction. This verification takes the form of calculating the check sum of the corrected tracks, and comparing this with the check sum that was written to tape in the meta data portions of the track.

Therefore, for double C3 correction to be reliable, the track check sums of the corrected tracks should be made available.

DDS formats store each one of the 46 track's check sums in two tracks sub code—these two tracks being the sister tracks (POS and NEG azimuths) in each of the 23 frames.

A situation occurs that if a complete frame is unreadable then it is not possible to retrieve the check sum sub code information from either track of a frame. If one of these tracks requires C3 correction, then it cannot be post correction verified, because the checksums for a track are stored in the meta data portions of the frame containing that track.

DAT 160 drives support double C3 correction for DAT 160 tape formats. This means that two C2 uncorrectable tracks in any group can be corrected. Following C3 correction, the corrected tracks have to be check sum verified to guard against mis-correction. This is done by comparing the re-calculated track check sum of the corrected track data with the check sum information contained in the sub code. In known products, a track's check sum is stored in the sub code of the two tracks in the group, that is, in the track in question, and the other track in the same frame. A situation occurs that if both tracks of a frame are completely unreadable, then although both these tracks can be restored through the use of double C3 correction, the check sums cannot be verified as no track checksum information will have been successfully retrieved from tape.

SUMMARY

This disclosure describes various schemes for storing a track check sums in more than two tracks sub code so that if a group is C3 correctable, then the corrected groups track sub code check sums will more likely be available for check sum verification.

According to a first aspect there is provided a method of processing data, said method comprising:

arranging data into a data group comprising a plurality of sub groups each said subgroup comprising a plurality of columns;

for each column, determining at least one checksum data of said column; and for each column, storing the checksum data of that column in a plurality of columns other than said column itself.

According to a second aspect there is provided a method of recovering data from a data storage medium, comprising:

reading a plurality of tracks of data from said data storage medium;

arranging said data into a group comprising a plurality of frames, each said frame comprising two columns;

re-calculating a check sum of the data in said column;

reading a check sum of said column from one or more other columns of the group, which are outside a frame containing said column; and comparing the recalculated check sum of said column, with the recovered check sum relating to that column, as read from said one or more other columns.

According to a third aspect there is provided an apparatus for processing data, said apparatus comprising:

a data processor operable for arranging data into a data group, said group comprising a plurality of columns;

a checksum generator operable to determine a checksum data of said columns; and a group processor operable for inserting the checksum data of each said column within at least two other said columns of the same group.

According to a fourth aspect there is provided an apparatus for recovering data from a data storage medium, said apparatus comprising:

a read channel for reading a plurality of tracks of data;

a group processor for forming said tracks into a plurality of columns in a group of data;

a checksum generator for calculating a checksum data of said columns; and a processor for comparing a calculated checksum of said column with a checksum of said column recovered from at least one other of said plurality of columns, wherein said at least one other said column is not located immediately adjacent said column.

According to a fifth aspect there is provided an apparatus for formatting data, said apparatus comprising:

means for storing a group of data;

means for performing data processing operations on said group of data;

means for error correction encoding and decoding said group of data;

means for generating a checksum of individual columns of said group;

wherein said means for performing data processing operations is operable to:

determine a plurality of checksums for a corresponding respective plurality of columns and to position the checksum of each column in at least two columns other than said column itself; and to compare a checksum of a column read from a data storage with a checksum for that column as read from a frame outside the frame which contains said column.

BRIEF DESCRIPTION OF THE DRAWINGS

There will now be described by way of example only, specific embodiments, methods and processes with reference to the accompanying drawings in which.

DETAILED DESCRIPTION

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

In general terms, the term "check sum" can be any data which serves as a verification of a set of user data. In a simple form, it may encompass a simple exclusive OR of a stream of data, or in another form it may incorporate a summation of a set of data values. A check sum may incorporate a cyclical redundancy code (CRC) which additionally may include position or rotation data. In this specification, where the term "check sum" is used, it is used mainly to indicate a cyclical redundancy code, but in the general case is not restricted to use or incorporate a cyclical redundancy code.

In this specification the term "column" is used to refer to a collection of a plurality bytes of data which belong together as a sequence. A column of data may exist as a stream of data, or may exist written to a plurality of memory locations, for example in a dynamic random access memory device, or may exist written to a data storage device for example a tape data storage device as a track.

In this specification the term "track" is used to mean a column of data in a form suitable for writing directly to an area of data storage medium, whether actually written to a medium or as existing electronically elsewhere, for example in a read or write channel of a device. Typically, in the embodiments disclosed, a track of data will be written to a defined region or area of data storage medium in a single pass of a write head across the data storage medium.

In this specification the terms "subgroup" and "G1 subgroup" are used to refer to two columns of data. The terms "sub group" and "G1 subgroup" include such data irrespective of its storage state, that is, irrespective of whether the subgroup is transiently stored in a memory, whether it is written on a data storage medium, such as for example a tape data storage medium, or whether it is in the process of being written or read in a read or write channel.

In this specification, the term "frame" is used to mean two columns of data.

In this specification the term "group" is used to mean a plurality of columns of data, (in the example embodiments shown being 44 columns). A group comprises a plurality of subgroups as described herein above. The terms "group" include such data irrespective of its storage state, that is, irrespective of whether the group is transiently or permanently stored in a memory, whether it is written on a data storage medium, such as a tape data storage medium, or whether it is in the process of being written or read in a read or write channel.

Figure 1:
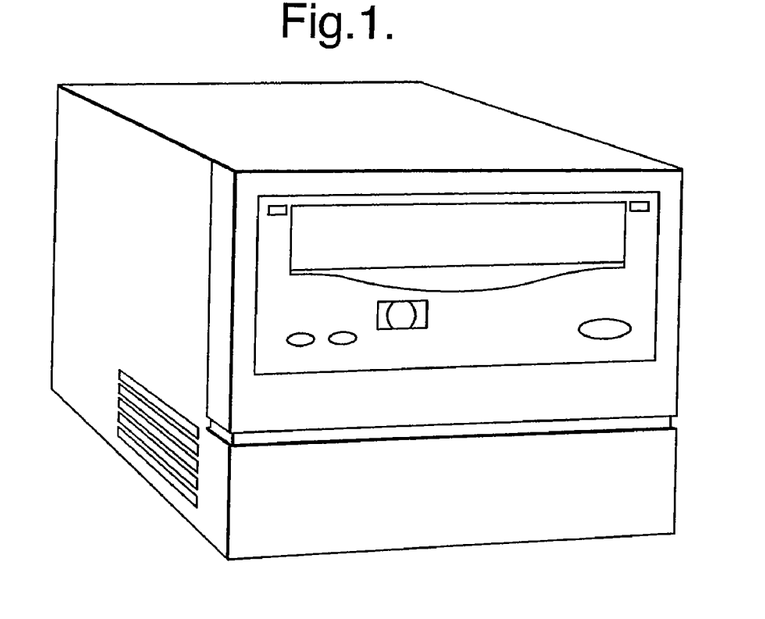
FIG. 1 illustrates schematically in perspective view, a tape drive unit for reading and writing data to a magnetic tape data storage device.

Referring to FIG. 1 herein, there is illustrated schematically in perspective view, a tape drive unit for writing data to a magnetic tape cartridge and for reading data from the cartridge. A data storage device, in the form of a linear magnetic tape cartridge is inserted into a slot in the tape drive, in which a rotatable read/write head sweeps across the tape as the tape is traversed in a forwards or reverse direction.

Figure 2:
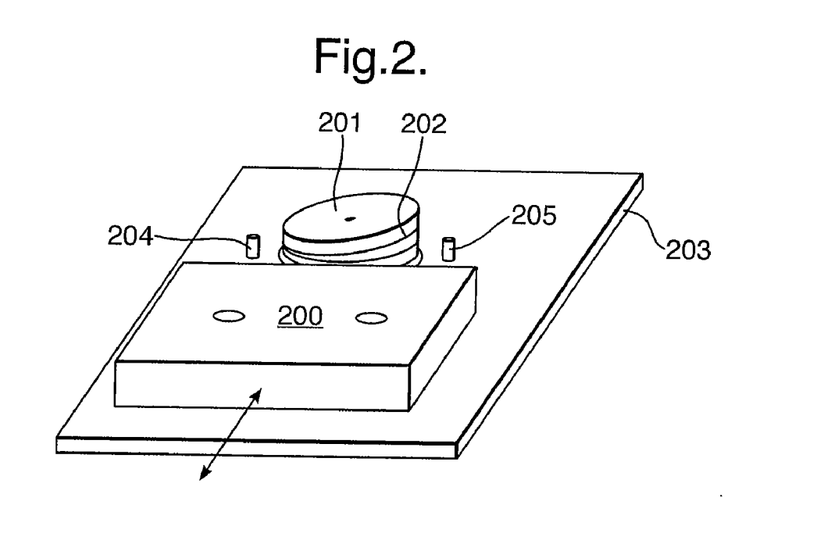
FIG. 2 illustrates schematically a layout of a tape data storage device and a tape drive mechanism.

Referring to FIG. 2 herein, there is shown schematically a layout of a tape data storage device in relation to a tape drive mechanism according to the DDS format, in which an elongate band of tape is contained within a removable tape cartridge 200. The tape cartridge is inserted into the tape drive mechanism. A rotating read/write head 201 comprises first and second read heads and first and second write heads situated at substantially equidistant points around the circumference of a rotating head. The head rotates on top of a substantially cylindrical metallic plinth 202. The read/write head rotates at a speed of approximately 6000 revolutions per minute. A main central axis of a cylinder formed by the outer surfaces of the drum and the plinth is directed off set from a line normal to a plane of a base plate 203 so that the effect is that as the band of tape traverses around part of the circumference of the cylindrical head plinth, the rotating heads describe a path diagonally along the width of the tape in successive passes of the heads past the tape. The tape is guided over the read/write head by tape guides 204, 205 either side of the read/write head.

Figure 3:
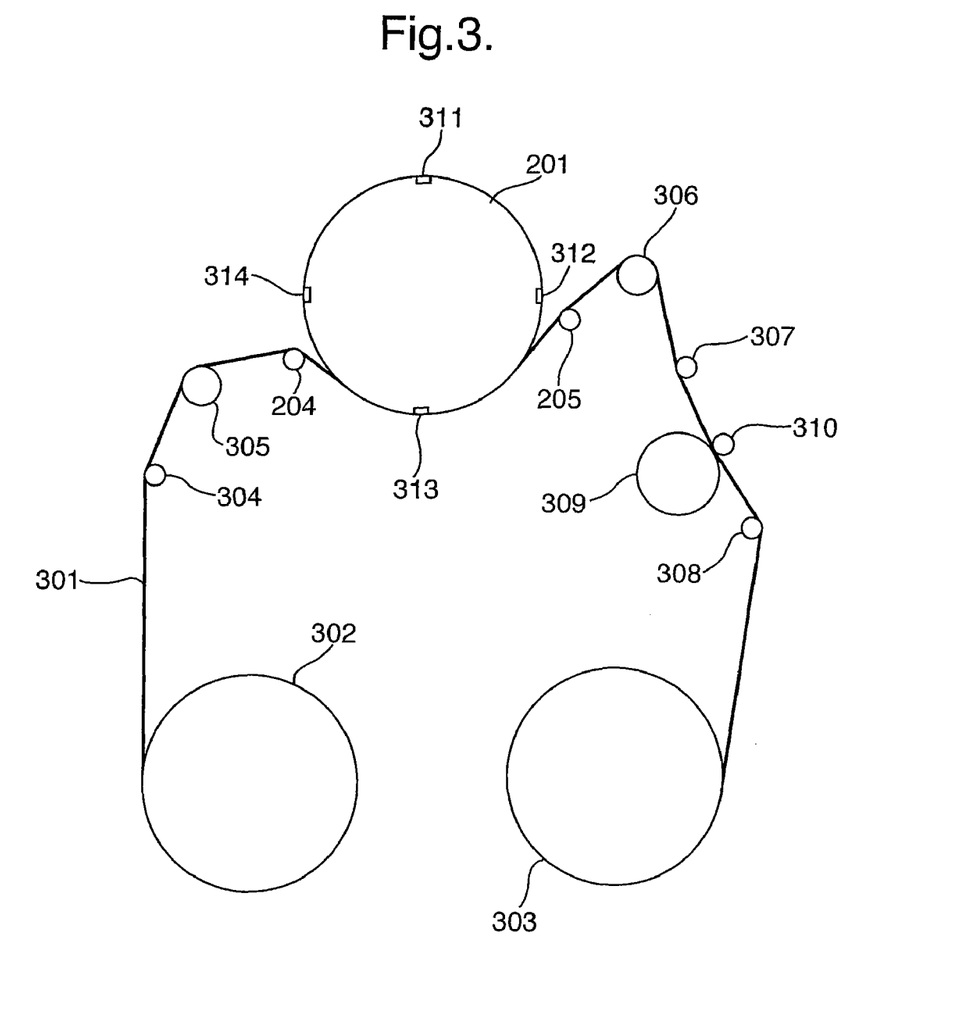
FIG. 3 illustrates schematically the path of a tape around a read/write head of a tape drive unit.

Referring to FIG. 3 herein, there is shown schematically a tape path of the elongate magnetic tape data storage medium 301 as it is drawn past the rotating drum containing the read and write heads. The tape data storage medium 301 is wound onto a feed reel 302 and a take up reel 303 which are within the removable tape cartridge 200. During normal operation, the magnetic tape 301 is wound from the feed reel 202 onto the take up reel 303. The path of the magnetic tape 301 is constrained by a plurality of rollers and tape guides 304 310. Additional tape guides 204, 205 determine the relative positions of the rotating drum 202, the read and write heads 311-314 and the tape data storage medium 301. The feed reel 302 and take up reel 303 are driven by electric motors to maintain the correct tension in the magnetic tape past the head.

Figure 4:
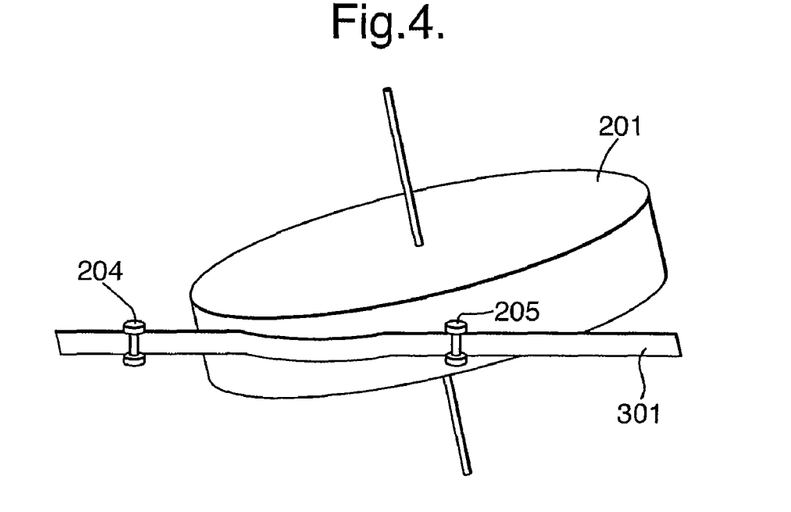
FIG. 4 illustrates schematically an orientation of a magnetic tape relative to a read/write head.

Referring to FIG. 4 herein, there is illustrated schematically the orientation of the magnetic tape 301 with respect to the rotating drum 201. The tape 301 is drawn past the rotating head at a relatively slow tape speed of the order of a few cm per second. However, the rotating drum 201 on which the read and write heads are mounted typically rotates at thousands of revolutions per minute, so the relative speed of the read and write heads to the drum is magnitudes of order greater than the linear tape speed. During a write operation, the write heads record a sequence of tracks diagonally across the elongate magnetic tape 201. The width of such tracks is typically of the order of 6.8 μm.

On the rotating head, one of the write heads is orientated in a positive magnetic orientation, and the other write head is orientated in a negative magnetic orientation. This allows the tracks to be written very close together, and to overlap each other in order to minimise track width and optimise utilisation of space on the magnetic tape data storage medium. Since alternate tracks are written with opposite magnetic orientations, this assists differentiating individual tracks from each other. After writing each track, on a next successive pass of the next write head, a significant portion of the immediately recently written track is over written by the next track, in an opposite magnetic orientation, enabling the resulting tracks to be of very narrow width next to each other. Typically, in a direction along the length of the tape, there are approximately 8.2 frames per millimeter written.

Figure 5:
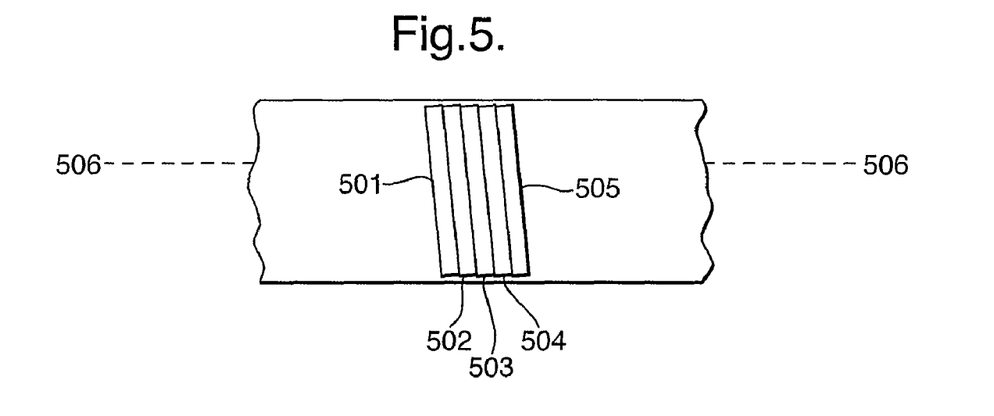
FIG. 5 illustrates schematically a layout of physical tracks across the width of an elongate magnetic tape band.

Referring to FIG. 5 herein, there is illustrated a layout of physical tracks 501-505 striped across the width of an elongate magnetic band tape. A plurality of tracks are written slightly over laying each other by successive paths of the right head of the rotating drum.

Alternate physical tracks, denoted A, B are written with a different magnetic azimuth, sometimes referred to positive (pos) or negative (neg). 44 individual tracks comprise a group, being the minimum unit of data which is written to tape in any one write operation, with an optional 2 tracks of C3 data Each track is written diagonally across the tape, from one side of the tape to the other, with reference to a main length 506 of the tape.

Figure 6:
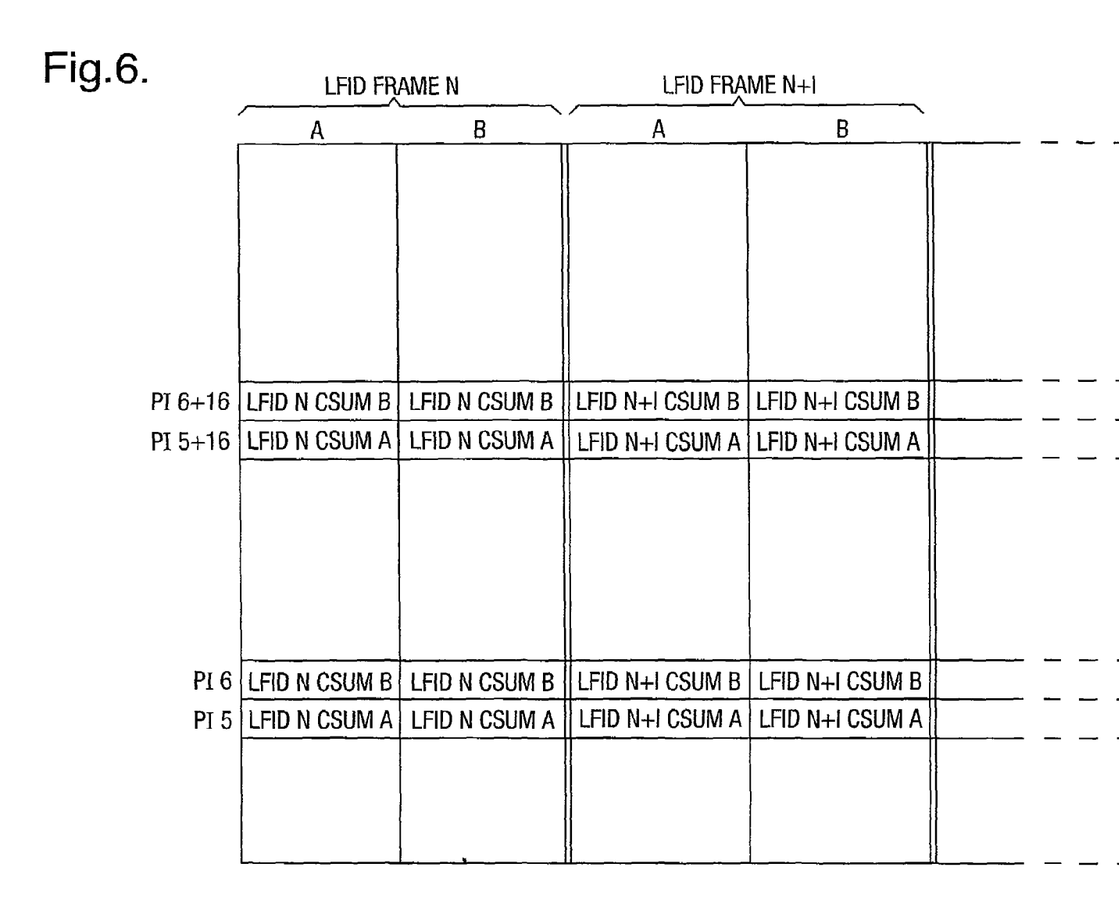
FIG. 6 illustrates schematically the lay out of a group of data in a known digital data storage format.

Referring to FIG. 6 herein, there is illustrated schematically a known lay out of a group of data in a DAT 160 format in the form of a two dimensional array. This layout applies for DAT 160 format.

User data is written to tape in bundles of information called groups. A group represents the smallest unit of data which is written to tape independently of other units of data. Consequently, if even a few bytes of data are to be written to tape, then a whole group including those few bytes will be written. In the DAT 160 format, a group of data has a size of approximately 1.5 Mbytes (1,537,448 bytes), although in the general case a group would not be limited to such size. A group comprises a linear list of bytes which can be represented logically as a two dimensional array of bytes. A group comprises 44 columns of data. Additionally, each group may be accompanied by a frame of C3 error correction data, the C3 frame comprising two columns of data. On formation of a group for writing, each column of bytes is subsequently written to tape as a single track, there being 22 frames of user data in the group where each frame comprises 2 tracks. A $23^{rd}$ frame comprises ECC C3 correction data, two columns being in the frame. The group has a number X of rows, where X varies depending on the specific implementation.

During group formation in a write operation, the C3 frame of data is computed after the group is populated with user data. All of the bytes in a single row, that is one byte form each of the 44 columns, is applied to the C3 Error correction coding to compute two bytes which form the two bytes for that row in the C3 frame (the $23^{rd}$ frame in the group). Therefore, each column of the C3 frame comprises a number X of C3 parity bytes.

Codewords may be computed by taking 44 bytes of user data across a row, one from each column of the same row, to determine two extra parity bytes according to a predetermined mathematical relationship. The two parity bytes for the row are inserted in the optional additional two columns of the same row position. The entire row of 46 bytes comprises a codeword. The two computed parity bytes are also known as ECC bytes.

Each group of encoded data comprises 22 frames, each frame is identified by a logical frame identifier (LFID) 1 to 22. Frames 1 to 22 contain user information, and the optional additional $23^{rd}$ frame contains error correcting information. All user data, file marks or set marks are encoded and error correction information is added. If there is mis-writing during writing of a group, then one or more of the frames may be re-written.

The term "G1 sub group" may be alternatively used instead of the term "frame" for the frames of user data (frames 1 to 22 of the group). In this specification the term "G1 subgroup" is used to mean the same as a "frame" when referring to a frame of user data. In the embodiments shown, there are 22 G1 subgroups of user data in a group of data. Additionally a further optional $23^{rd}$ G1 subgroup of C3 error correction code (C3 parity bytes) may be appended to the group.

Data is written to the tape data storage medium one frame at a time. Each frame of data comprises two tracks A and B, which are sometimes alternatively called positive and negative, because the magnetic azimuth between the two tracks is different. Generally a cylindrical write head has two magnetic write heads, each of which write a single track to tape during a single rotation of the cylindrical write head, resulting in a positive azimuth track and a negative azimuth track per revolution, this corresponding to a single frame written to tape.

Each track contains 384 fragments of data. Each fragment contains a portion of "main data" comprising encoded and error correction added user data being the data which is to be stored, and a fragment header. Typically, a fragment of main data is 124 bytes, and a fragment header is 8 bytes. There are therefore 384 fragment headers in a track.

Each fragment header contains a pack item (PI). A pack item is used to store information such as a current record count, a file mark count indicating the number of file marks there are in a tape; the group count information; track check sums and the like. The logical frame identifiers (LFID's) are contained within the pack items.

The record count information is used when performing a fast search along a tape. For example, if there is a host command to transport the tape 10,000 records along then the tape drive can quickly transport the tape the appropriate number of records, using the record count to determine which part of the tape is being read. When the tape is moving fast in fast forward or rewind mode, because the tape is moving quickly relative to the heads, the heads do not follow the centre line of a track and the head crosses tracks. However, because the fragment headers are only 8 bytes (80 bits), then even at elevated tape speeds the read head is able to pick up sufficient signal to recover fragment headers and can still read the pack item information and determine what the current record count is.

In each track, there are 16 types of pack item (PI 0 to PI 15). Because there are 384 fragment headers, each of these pack item types is repeated 24 times in a track. For example pack item X is stored in fragment header X; and fragment header X+16; and X+32 and so on.

The pack items are used to store sub code information. The sub code information includes the track check sum information.

Once the group and the additional $23^{rd}$ frame are created, the 23 frames are treated identically in the write channel. When the data is written to the tape data storage medium, it is split into 46 separate tracks, and the hardware automatically computes a cyclical redundancy code (CRC) of data of all the bytes of data within each track (C1 and C2 error correction codes are applied within each track). Once a group has been assembled in a DRAM, the hardware can go on to generate C3 frames and compute all 46 track checksums. The firmware is able to start processing each frame at a time and prepare the pack item data just prior to the frame being written to tape as a pair of tracks. The hardware computes a CRC for each track, where each CRC of a track is 32 bits in length. The CRC is used as a check sum of the bytes in a track.

Pack item 5 contains the track check sum for the A track (or the pos) track. Pack item 6 is the check sum for the B track (or the neg) track in a frame. Therefore, when writing a frame, the track check sum for the A (pos) track is stored in pack item 5 of the A (pos) track of the frame and replicated again in pack item 5 of the B (neg) track of the same frame. Similarly, for the same frame, the track check sum of the B (neg) track is stored in pack item 6 of the A (pos) track as well as being replicated in pack item 6 of the B (neg) track.

Therefore, for a Nth frame LFID N, pack item 5 contains the check sum for track A and pack item 6 contains the check sum for track B, where the check sums for track A and track B are stored in each of track A and track B of the same frame. Pack item 5 of each of tracks A and B each store the same information as each other. Similarly, pack item 6 of tracks A and B also each store the same information as each other.

In the next frame, LFID N+1, the check sum data for track A of that frame is stored in pack items 5 of tracks A and B of frame LFID N+1, and the check sum data of track B of the frame is stored in pack item 6 of tracks A and B of that N+1 of that frame. The pack item data is replicated 16 fragments on in the same track, in case of the track A check sum this is written at pack items 5, 5+16, 5+32, 5+48 and so on in each of the A and B tracks of the same frame.

When an Nth frame is read, track check sums for track A and track B of an Nth frame N stored in pack system PI 5 and PI 6 respectively in both tracks of frame N are read. Therefore, the track A check sum is recovered from fragment headers numbered: 5; 5+16; 5+32 and so on.

The track check sums are used to validate the data in the tracks when the data is read from the tape. When data is read there are various error correcting schemes. These are referred to as error correction codes (ECC) C1, C2 and C3. C1 and C2 correction are applied to each track (corresponding to 22 frames or 44 tracks) of the data group. C1 and C2 data are contained entirely within each track. The $23^{rd}$ frame does not contain user data, but contains C3 parity data. Once the C3 frame has been computed, it is treated as a regular frame and each of its two tracks have their C1 and C2 error correction codes computed.

C1 and C2 error correction schemes are performed automatically by the hardware of the tape drive during a read operation. Each track has its own C1/C2 error correction coding parity information. C1 correction is performed first, followed by C2 correction. If after C2 correction all of the data is verified as being C2 correctable then there may still be some C2 mis-corrections. Even if there are no C2 uncorrectables, then a checksum is still determined for each track to ensure that there are no mis-corrections. C2 uncorrectables may be recoverable if there are sufficient tracks to do C3 correction. I If there are one or more tracks that are uncorrectable using C1 and C2 correction, then C3 correction of the group may be attempted by the firmware of the tape drive. C3 correction is optional, since the host application software in the host device can instruct the tape drive to generate the C3 frame or not. If the C3 frame is generated, it is treated subsequently for write purposes as an ordinary data frame.

C3 correction happens along rows of data. That is, each C3 codeword comprises 46 bytes, 44 user—data bytes from the 44 columns/tracks of the group and 2 more which are computed and are the ECC parity bytes and which from the $23^{rd}$ frame. C3 correction uses 44 bytes in the same row position taken one from each of the 44 tracks of the group. This comprises a C3 code word.

There are two different types of C3 correction possible, single C3 correction and double C3 correction. Single C3 correction can detect the position of a bad code word, and correct up to one byte in error out of the 46 bytes. However, if there is more than one incorrect byte in a code word, then no more than two incorrect bytes in a codeword can be corrected by double C3 correction, and that these can only be corrected if their locations are known. If it is not known that 2 bytes are in error, (and there are more than 2 bytes in error in a codeword), then the C3 process may either mis-correct these two bytes without raising an C3 uncorrectable flag, or may generate a C3 uncorrectable flag Double C3 correction can correct two bytes in error, but double C3 correction cannot work out the position of the erroneous bytes and correct it. To effect C3 correction, the position of the erroneous bytes should be known. However, if the C3 algorithm can be told which bytes are in error (of up to 2 bytes in the C3 codeword), for example if the C3 algorithm was told that the $5^{th}$ and $17^{th}$ bytes were in error, then C3 double correction has the capability to correct both of those bytes. If the erroneous byte positions for C3 correction are incorrect, then there is a chance of double C3 mis-correction. Similarly as long as there are no other errors in any other bytes of the same C3 codeword then correction will be successful, but if there are other bytes in error in the same C3 codeword then mis-correction will occur. A C3 codeword comprises 46 bytes, and if there are X user data bytes in a track then there are X C3 codewords.

The information about the incorrect C3 bytes is known from elsewhere, from the C2 correction algorithm, since the C2 correction algorithm can determine which if the tracks were C2 uncorrectable. Therefore, this gives the track information of the incorrect bytes, and it can be determined which bytes of the track are probably in error. However, this information is not reliably accurate, since there may be more than 2 bytes in a track which are incorrect. When a track is read, C1 and C2 error correction is applied. C2 may correct, mis correct or flag as uncorrectable. When C2 flags uncorrectable, then all user data bytes in that track are treated as suspected bad, hence if there are X user data bytes in a track then one or more C2 uncorrectable flags will render all X user data bytes as being suspect bad. Each one of these X user data bytes belongs to one C3 codeword, there being X C3 codewords.

There is therefore redundancy of writing of the track check sum information of a track within that track and within the other track of the same frame. However, because the track check sums for tracks A and B in a frame are stored in those tracks of that frame, and not elsewhere, this means that if both tracks of a single frame are completely bad so that no fragment main data or header information is readable from the tape, then although double C3 correction could correct both of these tracks, there would be no check sum pack item information to check for double C3 correction. Therefore, there is a risk of double C3 mis-correction occurring which goes undetected.

This is addressed by the present disclosure.

In the case of double C3 correction, correcting two tracks:

Two tracks will have their main data modified.

The hardware will recalculate the check sums of all the bytes in each track.

The recalculated track check sums will be compared with the appropriate track check sum which was written to the tape in pack items 5 or 6 of the same frame.

Therefore the track check sums in the pack item are useful in determining if double C3 correction has occurred successfully or whether there is mis-correction. Double C3 correction can occur in a number of error recovery strategies, for example because of missing tracks. Even if all tracks are present, all tracks will have their track checksums computed on a read operation and have them compared with the check sums recovered form the meta data. If single or double C3 correction is applied, the track checksums are computed again and compared with the checksums recovered from the meta data. The track checksums are crucial in determining whether C2/C3 mis-correction has occurred. Effectively, there are conditions which can occur where the C3 algorithm operates, and thinks that it has corrected erroneous bytes in a code word, but actually one or more bytes in a C3 code word have been corrupted, and there is a mis-correction using the double C3 algorithm. Track checksums are used to validate C3 corrected tracks, if the track checksum algorithm is too simple then there is a real chance of incorrectly validating a C3 mis corrected track.

Consequently, in formats DDS1-DDS4 and DAT72, double C3 correction has been disabled, because the check sum was a 16 bit check sum, and this represents a 1 in 65,000 chance that a double C3 mis-correction would actually be validated as correct data due to the check sum.

A situation occurs as follows. If both tracks of a single frame are completely bad, so that no fragment, main data or header information is readable from the tape, then although double C3 correction could correct both these tracks, there will be no track check sum information to check for double C3 mis-correction of those tracks.

DAT 160 data frames contain 384 fragments per track. Each fragment header contains an item of sub code. DAT 160 format has 16 unique pieces of sub code per track—each repeated 384/16=24 times. Two of these pieces of each tracks sub code are the track check sums of the current track and for the sister track in the same frame.

In DAT 160, the check sum length is 32 bits, and so consequently, the probability of double C3 mis-correction not being detected is reduced even further, and therefore use of double C3 correction becomes feasible again.

However, there is still a situation that if the track check sum is stored in the same frame to which that check sum relates, if there is obliteration of both tracks in a frame, then the check sum data is lost and C3 double correction cannot be verified. After double C3 correction, to be sure that there has been no mis-correction, involves comparing the check sum of each track as originally written to tape, with the recalculated check sum of the double C3 error corrected track.

The DDS format does allow for some track check sum redundancy in that each tracks check sum is written to tape in the sub code of the two tracks information. Therefore, if one tracks' check sum sub code is unreadable then the information can be obtained from another track. However, if both tracks in a frame are unreadable, then C3 error correction cannot be reliably used because there is no C3 check sum data available for that frame.

However a situation exists that the data recovery performance of a DDS drive is still being limited in some cases by not being able to obtain the track check sum values.

A solution may be provided by storing the calculated C3 check sum data for each track in at least one other different track of the same group, and outside of the same frame of the track itself. Data recovery of obliterated data can be made by storing copies of the check sum of each track in more tracks of a group.

To avoid the situation of having a missing track check sum data where both tracks in the frame are unreadable, the track check sums of each individual check may be distributed throughout the whole group.

Rather than storing 24 copies of each of these two check sums in both tracks, it would be better to distribute the storage of all 46 track check sums throughout the sub code of each 46 tracks.

According to the specific embodiments and methods herein, there are two possible schemes as follows:

Scheme 1: In a best mode implementation, a copy of the check sum of each track is stored within a pack item of each other track in the group, and is stored in the pack item of the track itself, so that the check sum of each track is replicated throughout each track in the whole group, at a known pack item position.

Preferably, for each track, the check sum of that track is copied to adjacent tracks in the same group at a different row position, so that if there is a drop out of data at a particular row position in the group (which may correspond to a scratch in the length wise direction along the tape), then the check sum data of that track will not be lost, but will be recoverable from other positions across a width of the tape, from other tracks in the same group.

In the best mode, the check sum of a particular track is replicated and stored in other tracks LFID 1 to LFID 23 of the same group.

Scheme 2: In another implementation track_ID X contains check sums for track_ID X, X+1, X+2, X−1, X−2 (with appropriate modifications when nearing group boundary cases when track_ID is 0, 1, 2, 43, 44, 45), where X is 0 to 45.

A requirement of the hardware will be that in scheme 1, for example all track check sums will have to be calculated at the time that the track_ID is written to tape.

Figure 7:
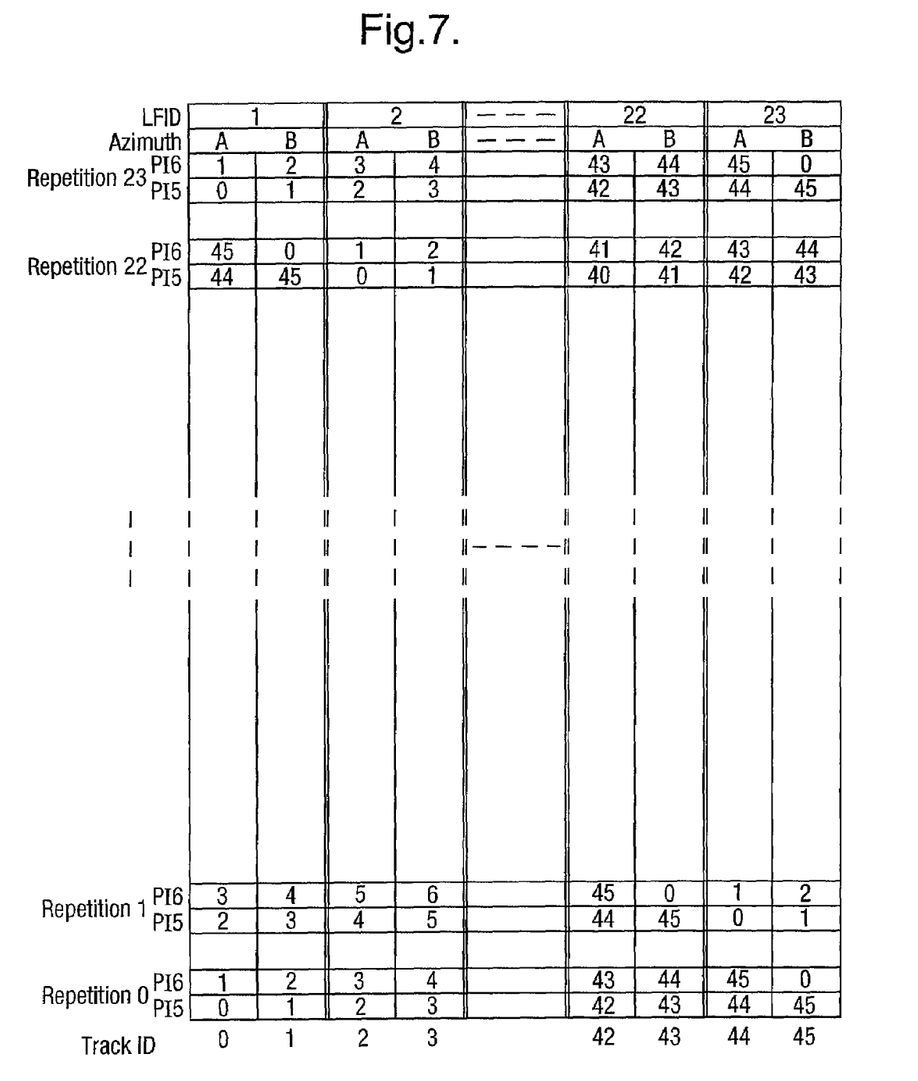
FIG. 7 illustrates schematically an array of data according to a best mode implementation herein.

Referring to FIG. 7 herein, there is illustrated schematically a two dimensional array of error correction coded data bytes according to a best mode implementation herein (scheme 1). The group is drawn schematically in a two dimensional array in FIG. 7, this being a convenient logical representation of the data. In practice the data is actually stored in a buffer or other memory as a linear series of individual memory locations.

A group of data comprises 22 frames, each frame having a pair of tracks with opposite positive and negative azimuths as written to tape, tracks A, B respectively, and an optional $23^{rd}$ frame In FIG. 7 herein, the logical two dimensional array of data is divided into a plurality of 44 columns in a group, with an optional 2 further columns for the error correction code bytes. When the columns are written to tape, each column A or B is written as a separate track, so that the columns of data correspond to physical tracks written to the data storage medium. Therefore, for the following description, reference to a column is equivalent to referring to a track and vice versa.

There are 44 tracks (columns) in a group, with an optional 2 tracks, the 44 tracks (columns) arranged into 22 frames, and similarly the 2 additional optional tracks, arranged into a $23^{rd}$ frame, each frame comprising a positive azimuth track (column) and a negative azimuth track (column).

Each track (column) contains 384 fragments of data, where a fragment comprises a fragment header (8 bytes) and a fragment body (124 bytes of data).

Each track has 24 pack item 5 locations and 24 pack item 6 locations. That is, in each track, there are 48 locations available for storage of check sum data of tracks in the group.

In the implementation shown, in each track, there is stored the check sum data for the track itself, and a check sum data corresponding to each other track in the same group.

Since there are 384 fragments in each track, and there are 16 different types of pack item, each set of [pack item 1 to pack item 15] is repeated 24 times (repetitions 0 to 23).

In the implementation shown in FIG. 7 herein, pack item 5 and pack item 6 are repeated 24 times within a track, and are used to contain check sum data for tracks 0 to 46. Since there is one additional repetition of pack items 5 and 6 in each track, these pack item locations can be used to contain a further replication of the check sum data for the track itself, and for its immediate neighbour track. For example, in track zero, the $23^{rd}$ repetition of pack items 5 and 6 are used to contain the check sum for track 0 and track 1 respectively, where those two tracks comprise frame 1.

In the best mode implementation, 24 pack items are allocated for containing check sum data in each track. It will be appreciated that other data locations in the track are used to contain error correction coded user data and other sub code data.

Viewing the group and its associated optional $23^{rd}$ frame as a logical two dimensional array, the check sum data is distributed in two dimensions in the array as follows.

In the array shown in FIG. 7, taking for example the bottom row, the first instance (repetition 0) of pack item 5, the numbers shown indicate that the track sum for track 0 is allocated to the first instance (repetition 0) of pack item 5 of track 0, and the check sum for track 1 is allocated to the first instance (repetition 0) of pack item 6 of track 1.

Similarly, in the bottom row, the track check sum for track 42 is contained in the first instance (repetition 0) of pack item 5 in track 42, and the check sum for track 43 is contained in the first instance (repetition 0) of pack item 6 of track 43. Correspondingly, the track check sum of each individual track is contained in the first instance (repetition 0) of pack item 5 of that same track.

For each track, in the first instance (repetition 0) of pack item 6 of that track, there is allocated the track check sum data for the adjacent track. For example, in track 0, at the first instance (repetition 0) of pack item 6, the track checksum for the adjacent track, in this case track 1 is allocated to that location. In track 1, the check sum for the adjacent track, in this case track 2, is allocated at the first instance (repetition 0) of pack item 6.

At the second instance of pack item 5 (first repetition of pack item 5) in each track, the track checksum for the next but one adjacent neighbouring track is located so that in pack item 5 of the first repetition in track 0, there is assigned the checksum of track 2, (which also appears in the $0^{th}$ repetition of pack item 6 of the immediate neighbour, track 1).

Similarly, in pack item 6 of the first repetition of track 0, the check sum data of the next but two neighbour track, in this case track 3 is assigned so that in track 0 repetition 1 pack item 6, there is stored the check sum data for track 3, and in repetition 1 pack item 6 of track 1, there is stored the check sum data of track 4.

Consequently, the check sum data for each track is assigned in a diagonal across the other tracks of the group, so that each track check sum data appears in each track of the group. Further, the track check sum data for a particular track appears at a different row position in each track compared to its row position in each other track. Therefore the track check sum data of each track is distributed across all tracks, and its pack item position appears to be rotated vertically as between successive columns in the array.

There are 24 repetitions of pack item 5 and pack item 6, (which gives 24×2=48 individual locations) in each track (column). 46 of those locations are used for track check sums for tracks 0 to 45, and the remaining two locations are used to repeat the track check sum for the track itself, and for its immediately adjacent next track.

In order to carry out the arrangement of FIG. 7, the firmware of the write channel is modified as follows.

The write hardware automatically generates the 32 bit track check sums and stores the 46 track check sums for a group in memory. When writing a group, the hardware works its way through the stored table of 46 track check sums in memory, and for each new track in the group, rotates the initial pack item position by one increment when it starts writing the track check sums in sequence, to fill the pack item positions in rotation.

Figure 8:
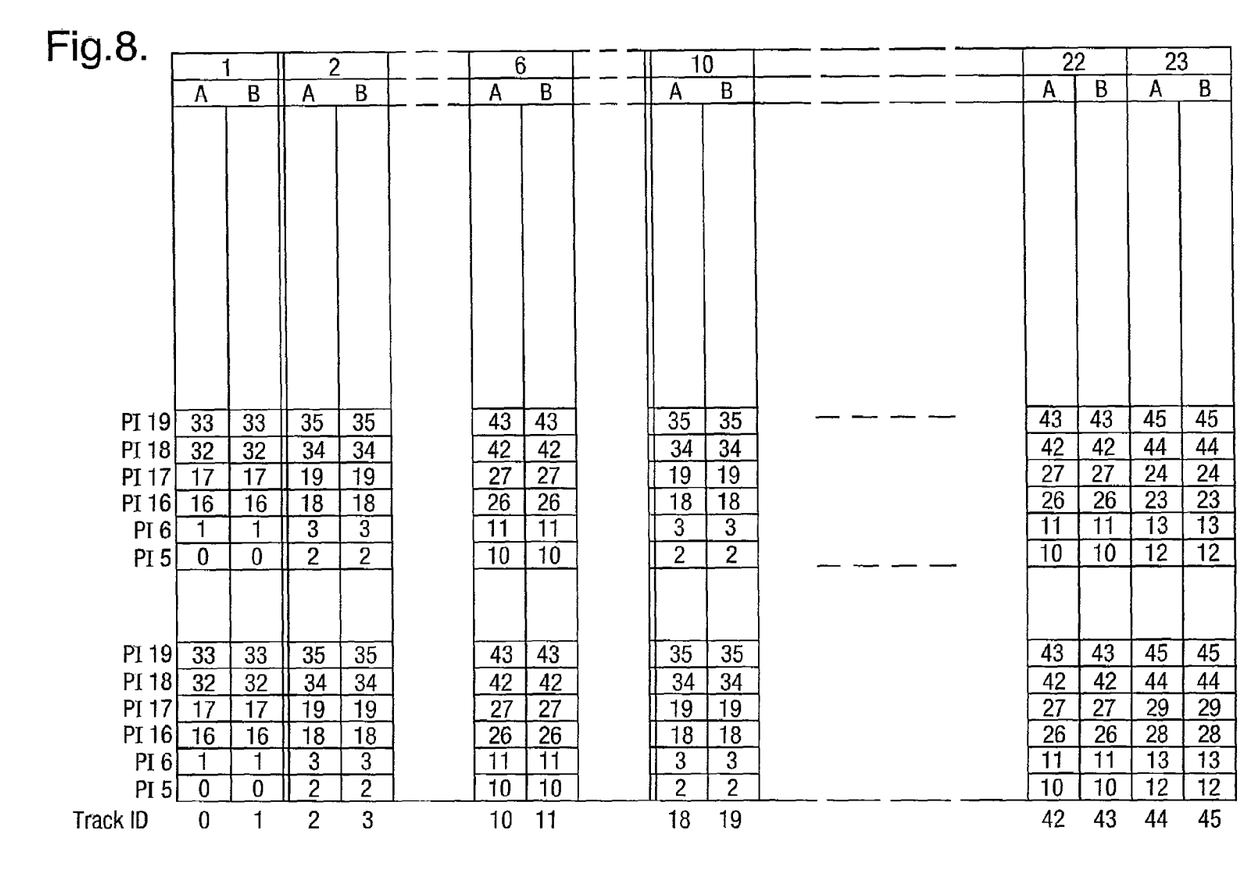
FIG. 8 illustrates schematically a second data array, according to a second specific implementation herein.

Referring to FIG. 8 herein, there is illustrated schematically a two dimensional data array according to a second specific implementation (scheme 2).

Check sums are stored in pack items 5, 6; 16, 17; 18 and 19. Six check sums are stored in each of the 46 tracks according to the following method.

If N is 0 to 45:
Check sum for track N is stored in track location:

$$((N/2)\times 2)\pm(16\times Y)$$

and $$((N/2)\times 2+1)\pm(16\times Y)$$

where Y is 0, 1, 2 etc; and where the track location is greater than or equal to 0 and less than or equal to 45.

For example, the check sum for track 27 would be stored in tracks:
26, 10, 42 and 27, 11, 43.
In this method:
pack items 5 and 6 store check sums for tracks 0 to 15
pack items 16 and 17 store check sums for tracks 16 to 31 pack items 18 and 19 store check sums for tracks 32 to 45.

Six track check sums are stored in each track, and those six track check sums are repeated multiple times in each track. In the second implementation, not all of the track check sums relating to each track are stored in every track, but track check sums for all of the tracks are distributed in two dimensions across the two dimensional array, so that when written to tape, the group of data is resilient to obliteration of individual tracks or pairs of tracks (frames) and to obliteration of rows of data, for example due to longitudinal scratches along the group, in a direction along the length of the tape.

In the second specific implementation, tracks 0 and 1 in the first frame each contain the same check sum data, replicated to each track, in this case the check sums for tracks 0, 1, 16, 17, 32, 33 and again repeated 23 times in the 23 repetitions of pack items 5, 6, 16, 17, 18 and 19.

Moving over to the next frame LFID 2 (tracks 2 and 3), the tracks for which check sums are stored are incremented, so that in the pack item set comprising pack items 5, 6, 16, 17, 18, 19, track check sums for tracks 2, 3, 18, 19, 34 and are written. These check sums are replicated in both tracks of the frame, tracks 2 and 3.

Figure 9:
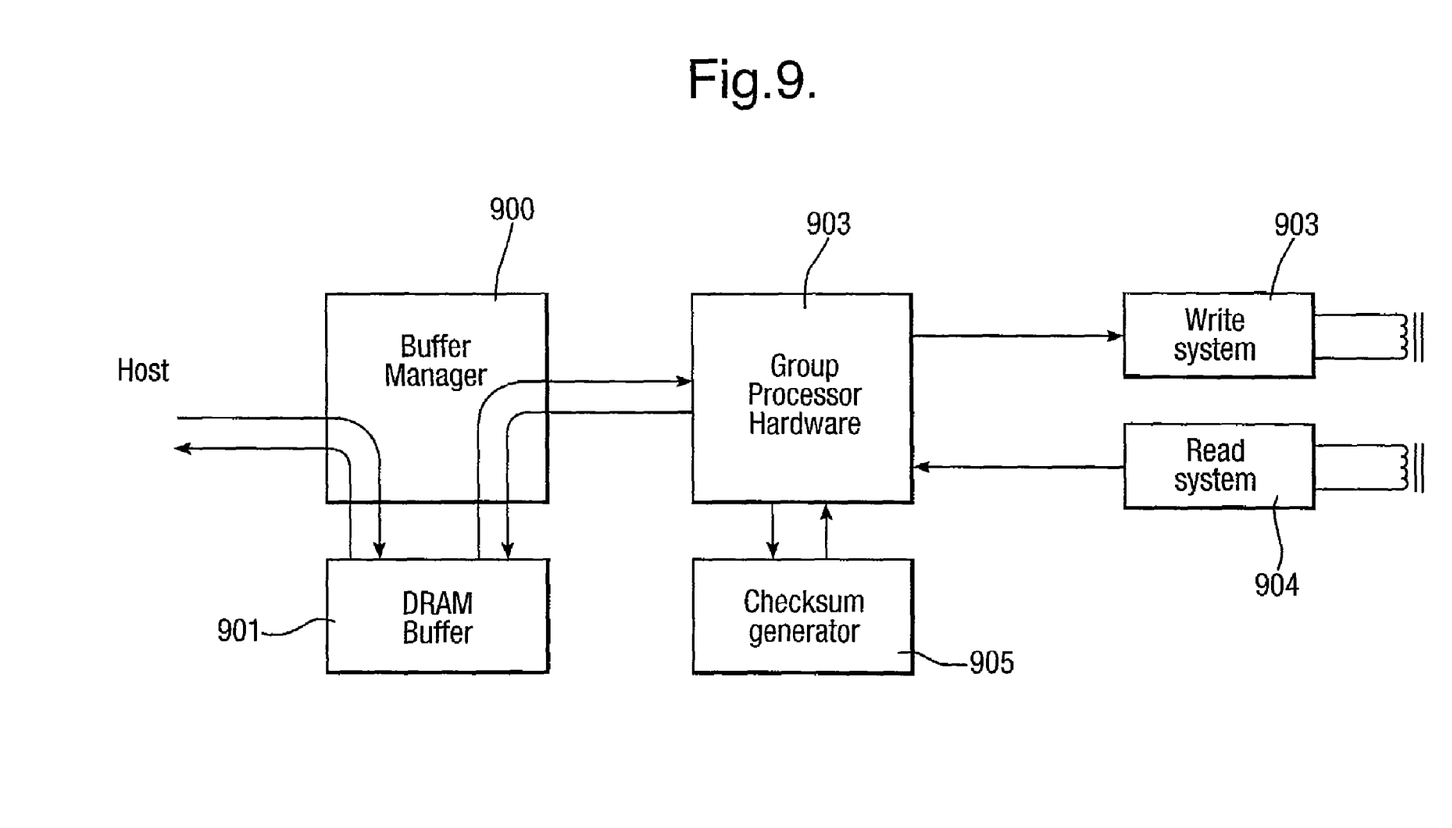
FIG. 9 illustrates schematically components of a write and read channel of a tape drive mechanism configured for writing and reading data to and from a tape data storage device, where the data is written and read according to the format of FIG. 7 or 8 herein.

Referring to FIG. 9 herein, there is shown schematically components of a write and read channel of a tape drive mechanism configured for writing and reading data to and from a tape data storage device in the format described in FIG. 7 or 8 herein.

The write channel comprises a buffer manager 900 for managing a dynamic random access memory (DRAM); a buffer 901 for storing the group of data; a group processor hardware 902 for processing groups of data during a write operation, for writing to tape, and for processing a stream of data read from tape during a read operation; a checksum generator for generating checksum data of tracks in the group; and a write system 903 for writing tracks of data to tape.

The read channel comprises buffer manager 900 for managing dynamic random access memory (DRAM); buffer 901 for storing the group of data whilst data processing operations are performed on said group; a group processor hardware 902 for processing groups of data during a read operation, and for processing a stream of data read from tape during a read operation; a checksum generator for generating checksum data of tracks in the group; and a read system 904 for reading data from tape. Checksum generator 905 operates to generate a checksum of individual tracks of data of the group during a read operation, and the checksum generator may also operate to compare the checksum of a C3 corrected track with a checksum recovered from the tape, or that operation can be carried out by the group processor.

The group processor 902 comprises various sub units, including C1, C2 and C3 error correction encoder and decoder components for encoding and decoding data, a component for inserting checksum data of individual tracks into meta data headers of tracks, before or as they are written to tape, and a checksum parser for recovering checksums from predetermined positions in the tracks as they are recovered from tape.

During a write operation the checksums are stored in a plurality of locations across the group, in the individual pack items as described above so that the checksum of each track appears in more than one frame when written to tape.

During a read operation, tracks are stored in a small buffer, and C1/C2 processes are applied. The result may be either:
1. there are no C2 corrections necessary (the track had zero bit errors);
2. there are a few bit errors which are C2 correctable;
3. there are so many C2 corrections that the C2 correction fails overall and reports C2 uncorrectable data; or
4. there are so many C2 corrections that the data is miscorrected, and the C2 processor reports this as a complete correction, even though there are C2 mis-corrections.

In condition 2 above there are only a few bit errors all of which are C2 correctable. Conditions 1, 2 and 4 above are indistinguishable because no hardware flag is—all C2 codewords are marked as correct or corrected. Hence, all tracks have their track checksums computed and compared with the checksums stored in the meta data.

Track are assembled as columns in DRAM buffer 901 and the track checksums are re computed. Prior to applying C3 error correction the column checksums are compared with the checksums stored in the pack items. C2 mis corrections can be identified at this stage because the recomputed column checksums will be incorrect.

Where the firmware detects that there are sufficient tracks, a C3 syndrome check may be invoked to further check the integrity of the group, and a number of C3 corrections may be made. The syndrome check can occur when all 46 bytes of a C3 codeword are present and verifies that the entire 46 byte sequence conforms to a predetermined mathematical relationship. A syndrome of zero means that there are no errors in the C3 codeword. A non zero syndrome indicates that there are some errors in a codeword. If all 46 tracks have been recovered, then a syndrome check can be performed, but if only 44 or 45 tracks are recovered, then a syndrome check cannot be performed and a single or double error correction may be carried out, depending on the specific format. If 43 or fewer tracks out of 46 tracks are recovered, then user data cannot be returned to the host.

Where C3 corrections are made the firmware proceeds to recomputed all column checksums again and to compare them with those recovered form the pack items. Only when the checksums agree will the user data be returned to the host device.

The checksum generator operates to generate checksums of individual double C3 corrected tracks, where double C3 correction has been applied after recovery of the tracks from tape. The group processor 902 compares the recalculated checksums for the double C3 corrected tracks with their original checksums as originally written to tape and as recovered from more than one frame of the group.

Where the original checksums are recovered from the tape, and a plurality of checksums are read for a single track, but the checksums are not all identical for that track, then a voting protocol may be applied to determine a checksum for the track, where the voting protocol operates on two checksums, read from different frames of a group. The voting protocol may apply a vote to a plurality of track checksums for a single track where the plurality of checksums are recovered at least one from each track on the tape.

The group processor also comprises as a sub unit, a comparator for comparing the checksums of double C3 corrected tracks, which have had C3 correction applied after reading from tape, with at least one checksum recovered from a frame other than the frame which contained the track to which C3 correction has been applied.

Figure 10:
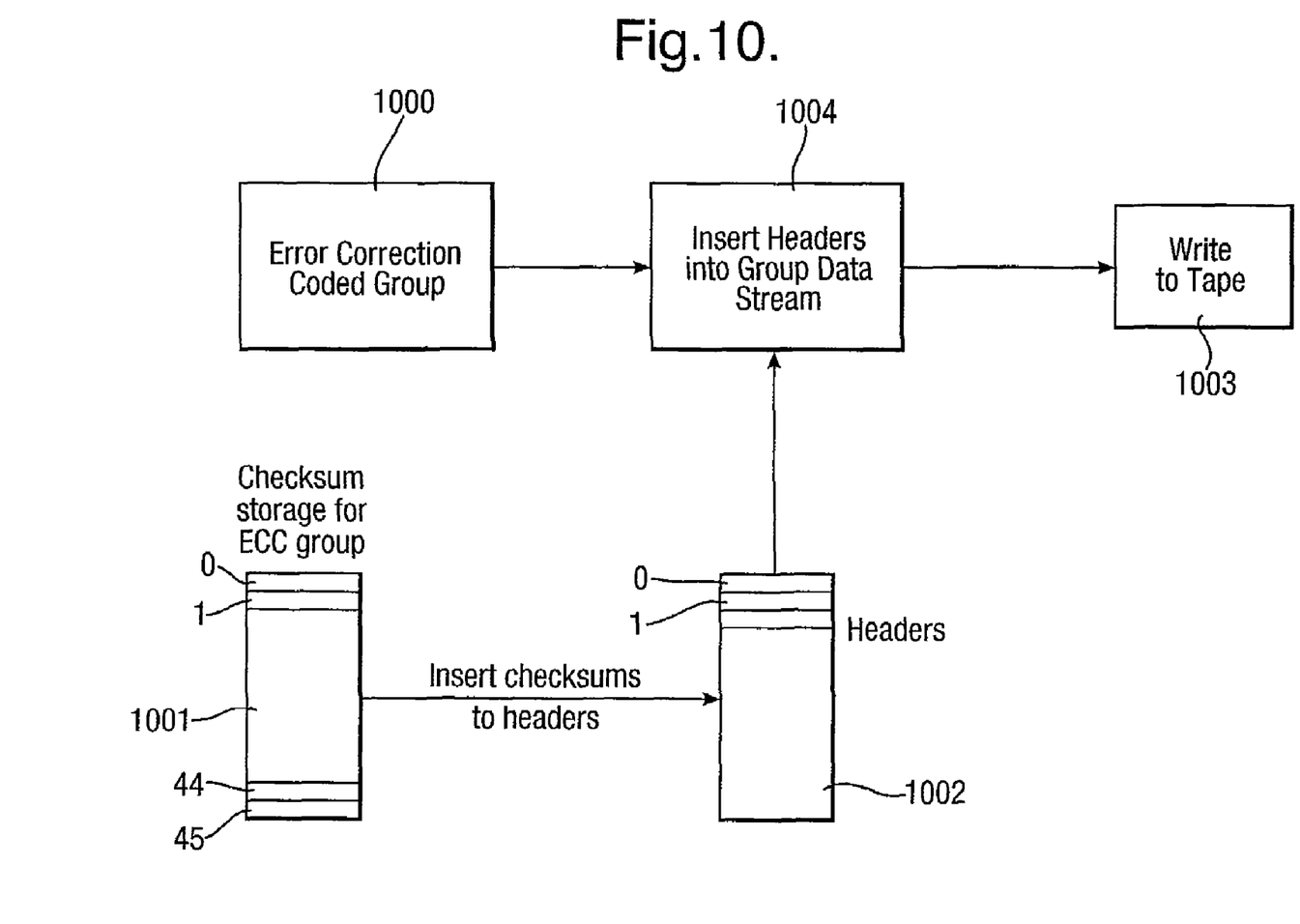
FIG. 10 illustrates schematically processes for formatting a group of data and applying checksum data within a group using the formats described with reference to FIGS. 7 and 8 herein.

Referring to FIG. 10 herein, there is illustrated schematically processes for formatting a group of data and applying checksum data within a group for writing to a tape data storage device, using the formats described with reference to FIGS. 7 and 8 herein.

A group of data 1000 is stored in the DRAM buffer as a series of linearly arranged memory locations. The group has C1, C2 and C3 error correction coding applied. Groups are assembled as a host computer or other data source device sends data to the tape drive for writing to tape.

Figure 11:
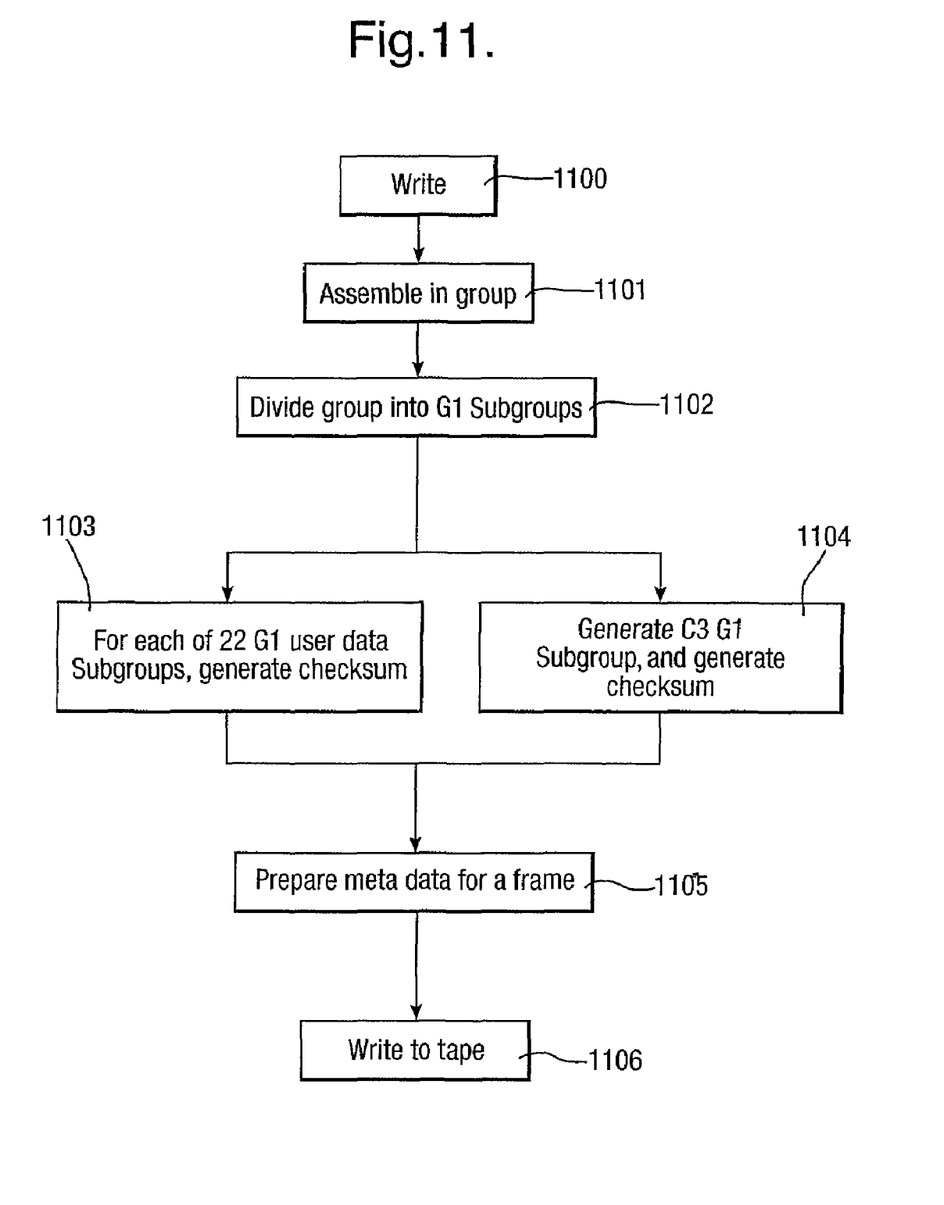
FIG. 11 herein illustrates schematically in flow chart form, processes for preparing a group of data for writing to tape, using the positioning of checksum data within a group as described with reference to FIGS. 7 and 8 herein.

Referring to FIG. 11 herein, there is illustrated schematically in flow chart form, processes for preparing a group of data for writing to tape, using the positioning of checksum data within a group as described with reference to FIGS. 7 and 8 herein.

Error correction coding is applied to the group in process 1000. This includes the application of C1, C2 and C3 error correction coding. Checksum data is generated for each G1 sub group of the group including the 22 G1 user data sub-groups and the single C3 G1 sub group. The checksums populate a series of memory locations 1001 which are allocated to a set of headers 1002 corresponding to the 23 G1 subgroups of the group. As an ongoing streaming process, as the group is streamed to the write head for writing to tape in process 1003, the headers are inserted into the data stream of G1 sub groups at the appropriate positions so that the group is written to tape in a format in which a checksum for each G1 subgroup is present in more than one G1 subgroup of the group.

In a best mode, a checksum of each G1 sub group is present in every G1 subgroup of the group as written to the tape data storage medium.

A process 1100 for writing data to a data storage tape comprises assembling 1101 user data into a group; notionally dividing 1102 the data into a plurality of G1 sub groups; for each of 22 G1 user data sub groups, generating 1103 checksum data; generating 1104 a C3 G1 sub group and generating a checksum of that group; preparing 1105 meta data headers for containing the checksum data of the 22 G1 user data subgroups and the C3 G1 sub group; and writing the data to tape as a plurality of tracks where two tracks comprise a G1 sub group, and for each G1 subgroup, a checksum of that subgroup is written to more than one subgroup in the same group, thereby achieving replication of the checksum at a plurality of positions within a group as written to tape.

As each G1 subgroup is written to tape, an algorithm determines a 32 bit checksum for each track, so that two 32 bit checksums are determined for each G1 sub group. The checksums for the tracks are replicated and distributed across the group, so that as the tracks are written to tape as a pass of each of the two write heads, a checksum of each track occurs at two or more frames on the tape (where a frame comprises a pair of tracks of +ve and −ve azimuth).

The write operation involves arranging data into a two dimensional array in a plurality of columns and a plurality of rows; applying C1, C2 and C3 error correction coding to said array of data; for each column, determining a checksum data of said column; for each column, repeating the checksum data of that column within more than two columns of the array; and writing each said column to a corresponding respective track on said data storage medium.

Each said subgroup comprises a pair of tracks, and track check sums for all of the tracks of the group are distributed in two dimensions across a two dimensional series of tracks written to the data storage medium, which corresponds to said data group.

Error correction data is written in a group of data, said group of data comprising an array a plurality of columns and a plurality of rows, where each column comprises a plurality of fragments of redundancy coded user data, and a plurality of fragment headers containing sub code data. A checksum is determined for each said track; and for each said track, check sum is stored in the sub code of at least one other track of said same group, wherein said at least one other track is outside a same frame as the track for which check sum data has been determined.

Figure 12:
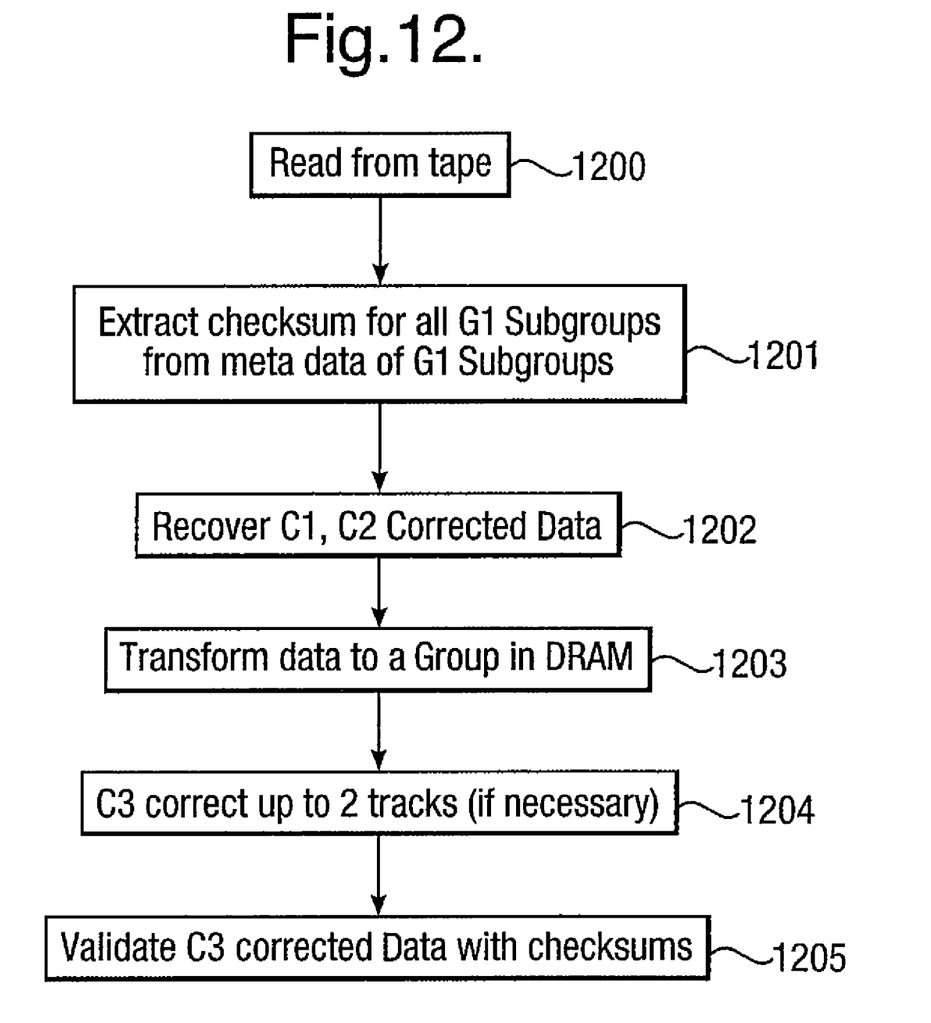
FIG. 12 herein, illustrates schematically processes for reading from tape and data processing of data groups, where the data groups have checksum data as described with reference to FIGS. 7 and 8 herein.

Referring to FIG. 12 herein, there is illustrated schematically processes for reading from tape and data processing of data groups, where the data groups have checksum data as described with reference to FIGS. 7 and 8 herein.

A process 1200 for reading data from tape and processing the data comprises reading the data from tape via the read heads of the tape drive unit to create a data stream of read data. A stream of G1 subgroups are recovered from the tape along with a series of 32 bit checksums which were determined at the time of writing the data to tape. Checksums for the tracks of all of the G1 sub groups are extracted 1201 from the meta data headers of 2 or more frames read from tape. C1 and C2 recovery is applied 1202 to obtain C1 and C2 corrected data. The data is transformed 1203 into a group in memory by storing the group data in a plurality of memory locations which could be viewed schematically as a logical two dimensional array. C3 correction may be applied 1204 to one or a plurality of tracks, if necessary. In the best mode up to 2 tracks may be subjected to C3 correction. The C3 corrected tracks are validated with a checksum which has been recovered from more than one frame (corresponding to more than one G1 sub group) read from the tape. C3 uncorrected tracks are also similarly validated.

Each group of data is stored in the DRAM buffer as a series of linearly arranged memory locations. Groups are assembled as the data is read from tape. C1 and C2 error correction are applied, and if necessary C3 error correction is also applied.

Where C3 error correction is applied, the C3 error corrected G1 subgroups can be checked for their integrity and correction by comparing generating checksums of the tracks of the G1 sub group and comparing it with the track checksums recovered from tape, where the track checksums for each G1 subgroup are recovered from more than one G1 subgroup read from tape. Similarly, the computed track checksums of uncorrected tracks are validated against the track checksums read from the data storage media.

In the specific embodiments described herein, if both tracks in a frame are uncorrectable using C2 correction, then C3 double correction may be run, and when the two tracks in the frame are error corrected using C3 double correction, a new check sum of the corrected tracks can be generated. The new check sum of the corrected tracks can be compared with the originally written track check sum for that track, which is available to be read from another track in the group. Consequently, the risk of C3 mis-correction errors may be alleviated.

An advantage of the specific embodiments and methods may be that for low firmware overhead, with little or no impact on drive capacity, the data recovery performance of the drive can be enhanced. The ability of a drive to prevent incorrect user data from being returned of a host device may be improved.

Additionally, a further advantage may be that redundant copies of the track check sums are stored in multiple tracks, and this can be used to confirm that the correct track information is read, rather than experience a drop in data.

In the best mode implementation herein, a data group having 384 fragments per track is disclosed. However, in other embodiments, the number of fragments per track is not limited to 384, and it will be appreciated by a person skilled in the art that different number of fragments per track may be implemented.

The invention claimed is:

1. A method of processing data, said method comprising:
arranging data into a data group comprising a plurality of subgroups each said subgroup comprising a plurality of columns;
for each column, determining at least one checksum data of said column;
for each column, storing the checksum data of that column in at least one of said subgroups other than the subgroup to which said column belongs; and
writing said data to a data storage medium.

2. The method as claimed in claim 1 comprising, for each column, repeating the checksum data for said column at a plurality of locations distributed within the group, said plurality of locations being outside a subgroup of the column to which the checksum data belongs.

3. The method as claimed in claim 1, wherein, each said column comprises a plurality of pack items, and a checksum of a said column is written to pack items M and N of each said column, where M is any pack item 0 to 15, and N is any pack item 0 to 15, and M and N are different pack items to each other.

4. The method as claimed in claim 1, wherein, the checksum of a particular column is stored in other columns of the same group, at pack item positions having randomised positions in a group, and across every other column in the group.

5. The method as claimed in claim 1, wherein each said subgroup comprises a pair of columns, and the checksum data for all columns of the group is allocated in each column of the group.

6. The method as claimed in claim 1, wherein each said subgroup comprises a pair of columns, and a checksum for a column: track_ID, X+1, X+2, X−1, X−2 is stored in a column: track_ID X, where X is 0 to 45.

7. The method as claimed in claim 1, wherein each said subgroup comprises a pair of columns, and the checksum data for successive columns of said data group is stored in a diagonal across other columns of the data group so that each column's checksum data appears in each column of the data group, and each checksum data for a particular column appears at a different row position in each column.

8. The method as claimed in claim 1, wherein a checksum data for a column N is stored in a column location;

$$((N/2) \times 2) \pm (16 \times Y)$$

and $$((N/2) \times 2 + 1) \pm (16 \times Y)$$

where Y is an integer in the series 0, 1, 2 . . . , and where the column location is greater than or equal to zero and less than or equal to 45.

9. An apparatus for processing data, said apparatus comprising:
a data processor operable for arranging data into a data group, said group comprising a plurality of columns;
a checksum generator operable to determine a checksum data of said columns; and
a group processor operable for inserting the checksum data of each said column in at least one of plurality of subgroups other than the subgroup to which said column belongs.

10. The apparatus as claimed in claim 9, wherein said group processor is operable for each column, to repeat the checksum data for said column at a plurality of locations distributed within the group, said plurality of locations being outside the column to which the checksum data is the checksum of.

11. The apparatus as claimed in claim 9, wherein said group processor is operable to allocate checksums to tracks, wherein each said subgroup comprises a pair of tracks, and the checksum data for all tracks of the group is allocated to each track of the group.

12. A method of processing data, said method comprising:
arranging data into a data group comprising a plurality of subgroups each said subgroup comprising a plurality of columns, wherein, each said column comprises a plurality of pack items, and a checksum of said column is written to pack items M and N of each said column, where M and N are different pack items to each other;
for each column, determining at least one checksum data of said column;
for each column, storing the checksum data of that column in a plurality of columns other than said column itself; and
writing said processed data to said data storage medium.

13. The method as claimed in claim 12 where M is any pack item 0 to 15, and N is any pack item 0 to 15.

14. The method as claimed in claim 12 comprising, for each column, repeating the checksum data for said column at a plurality of locations distributed within the group, said plurality of locations being outside a subgroup of the column to which the checksum data belongs.

15. The method as claimed in claim 12, wherein, each said column comprises a plurality of pack items, and a checksum of a said column is written to pack items M and N of each said column, where M is any pack item 0 to 15, and N is any pack item 0 to 15, and M and N are different pack items to each other.

16. The method as claimed in claim 1, wherein, the checksum of a particular column is stored in other columns of the same group, at pack item positions having randomised positions in a group, and across every other column in the group.

17. The method as claimed in claim 1, wherein each said subgroup comprises a pair of columns, and the checksum data for all columns of the group is allocated in each column of the group.

18. The method as claimed in claim 1, wherein each said subgroup comprises a pair of columns, and the checksum data for successive columns of said data group is stored in a diagonal across other columns of the data group so that each column's checksum data appears in each column of the data group, and each checksum data for a particular column appears at a different row position in each column.

19. The apparatus as claimed in claim 9, wherein each said column comprises a plurality of pack items, and a checksum of a said column is written to pack items M and N of each said column, where M and N are different pack items to each other.

20. The apparatus as claimed in claim 9, where M is any pack item 0 to 15, and N is any pack item 0 to 15.

* * * * *